United States Patent [19]
Zaidi

[11] Patent Number: 5,619,668
[45] Date of Patent: Apr. 8, 1997

[54] APPARATUS FOR REGISTER BYPASSING IN A MICROPROCESSOR

[75] Inventor: Syed A. A. Zaidi, Santa Clara, Calif.

[73] Assignee: Intel Corporation, Santa Clara, Calif.

[21] Appl. No.: 310,933

[22] Filed: Sep. 22, 1994

Related U.S. Application Data

[63] Continuation of Ser. No. 927,708, Aug. 10, 1992, abandoned.

[51] Int. Cl.$^6$ ................................................. G06F 9/38
[52] U.S. Cl. .................. 395/376; 364/231.8; 364/937.1; 364/239.8; 364/258
[58] Field of Search .................................. 395/775, 725, 395/376, 800

[56] References Cited

U.S. PATENT DOCUMENTS

| | | | |
|---|---|---|---|
| 4,003,033 | 1/1977 | O'Keefe | 364/DIG. 1 |
| 4,042,972 | 8/1977 | Gruner | 364/DIG. 1 |
| 4,112,489 | 9/1978 | Wood | 364/DIG. 1 |
| 4,382,279 | 5/1983 | Ugon | 364/DIG. 1 |
| 4,942,525 | 7/1990 | Shintani et al. | 395/375 |
| 5,125,083 | 6/1992 | Fite | 395/375 |
| 5,203,002 | 4/1993 | Wetzel | 395/800 |

*Primary Examiner*—David Y. Eng
*Attorney, Agent, or Firm*—Blakely, Sokoloff, Taylor & Zafman

[57] ABSTRACT

A microprocessor having an architecture for pipelining instructions to reduce the time necessary to execute sequential instructions including an arithmetic and logic unit for processing information; a register file for storing data to be used by the arithmetic and logic unit, the register file including individual registers from which data is read for operations by the arithmetic and logic unit and to which data is written which results from operations of the arithmetic and logic unit; and apparatus for obtaining updated data from a source other than the register file when sequential instructions processed by the arithmetic and logic unit change data in a particular register in the register file during a first instruction and then use the data in the register file which was changed in a second instruction so that the data in the particular register is stale at the time it is required for the second instruction.

16 Claims, 5 Drawing Sheets

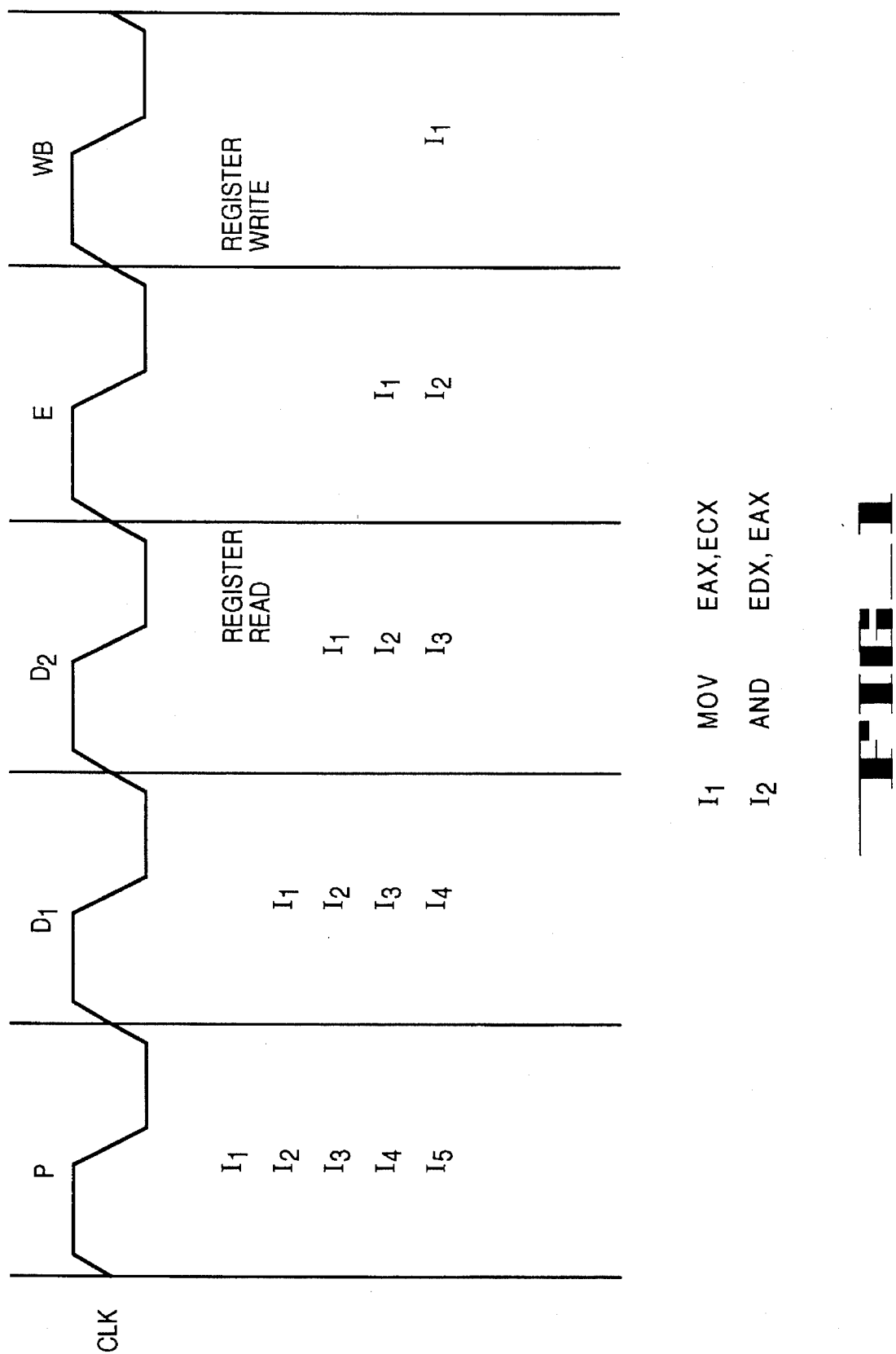
FIG_1

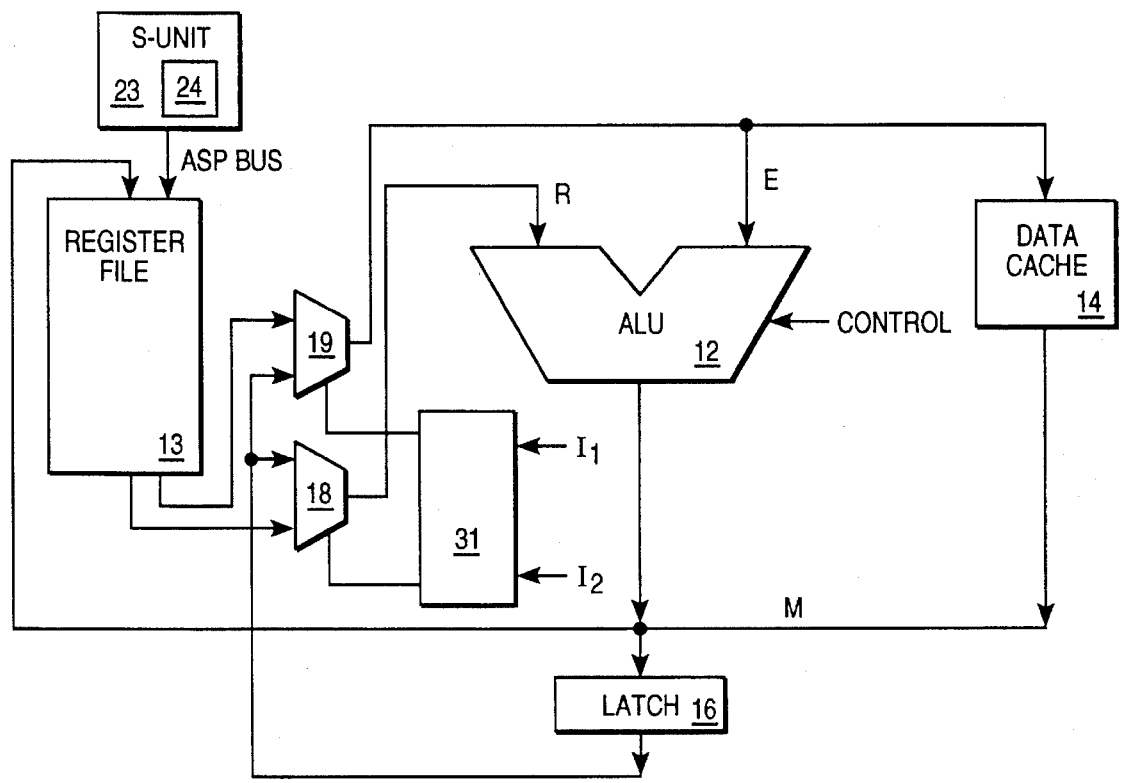
FIG_2
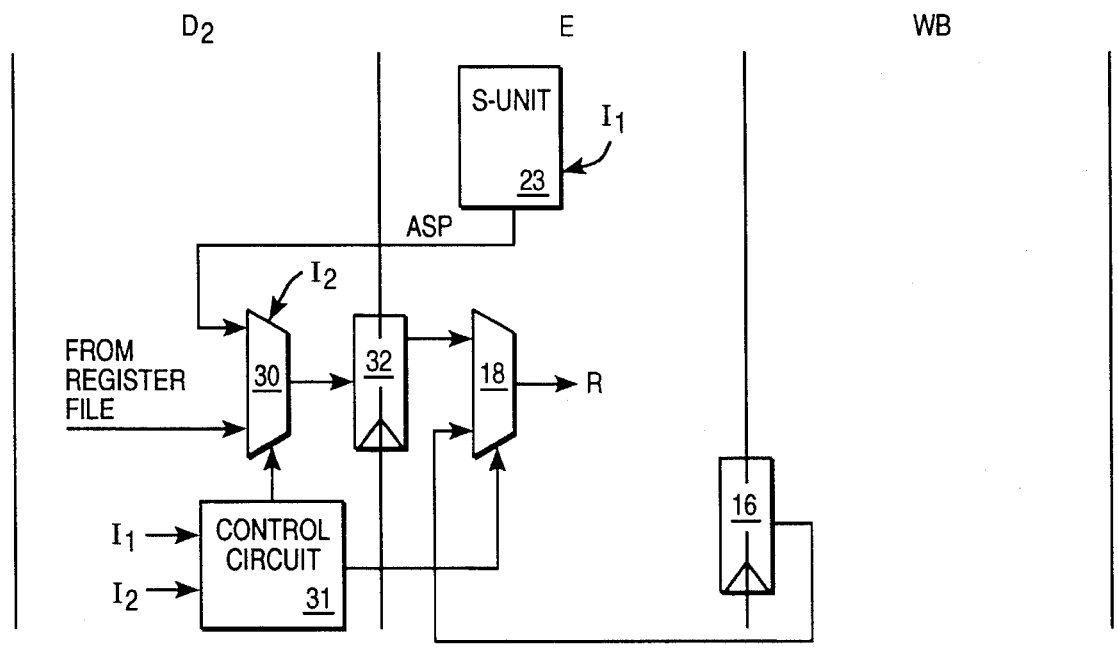
FIG_3

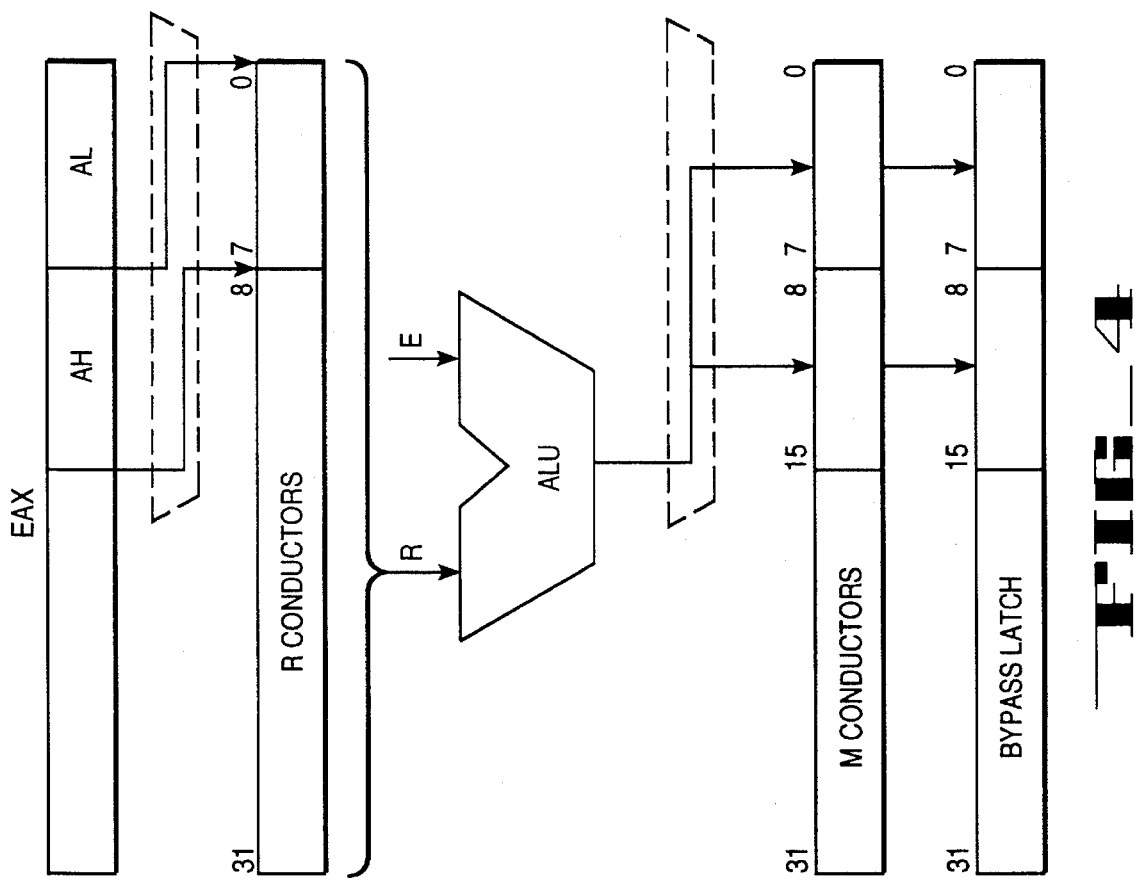
FIG._4

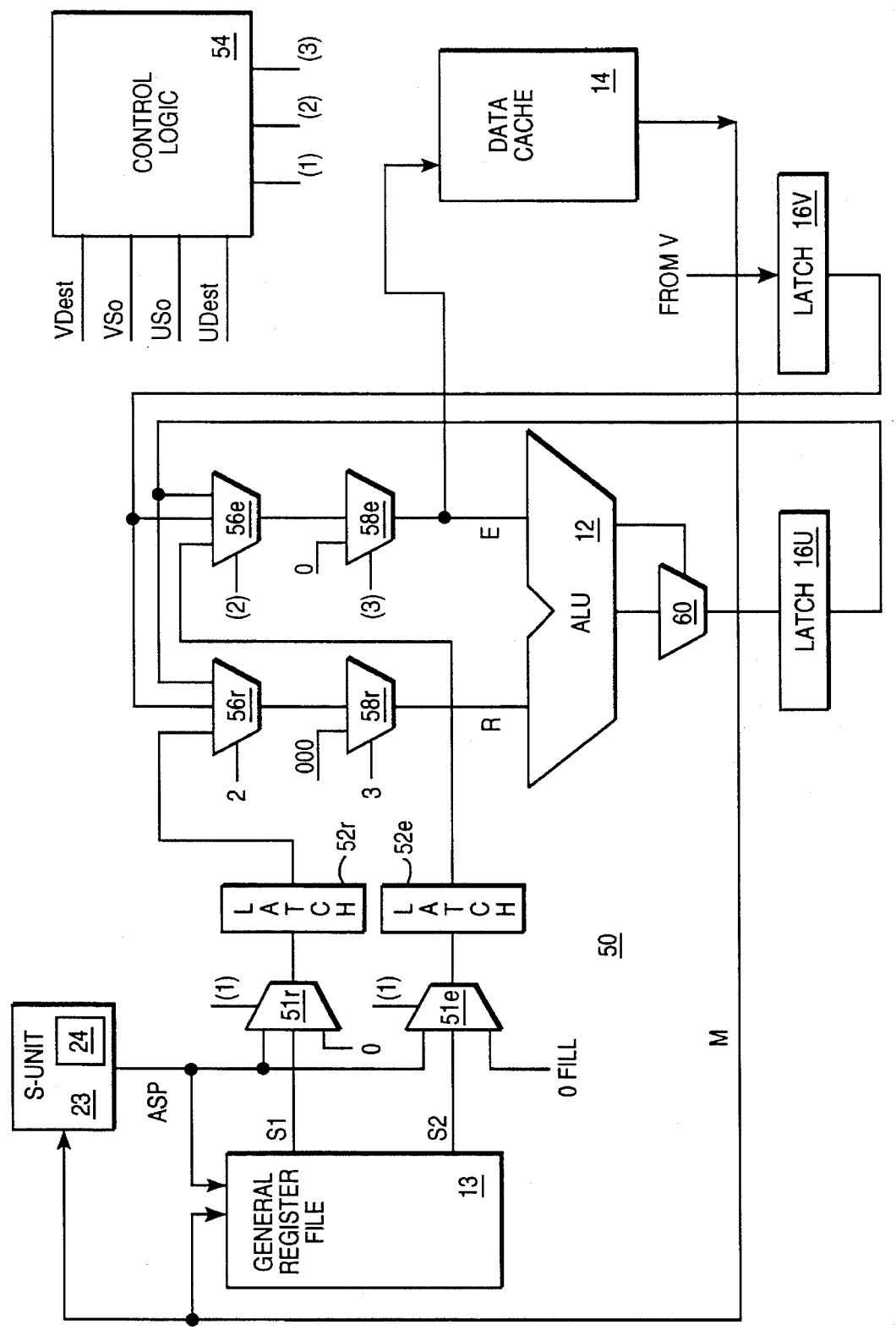

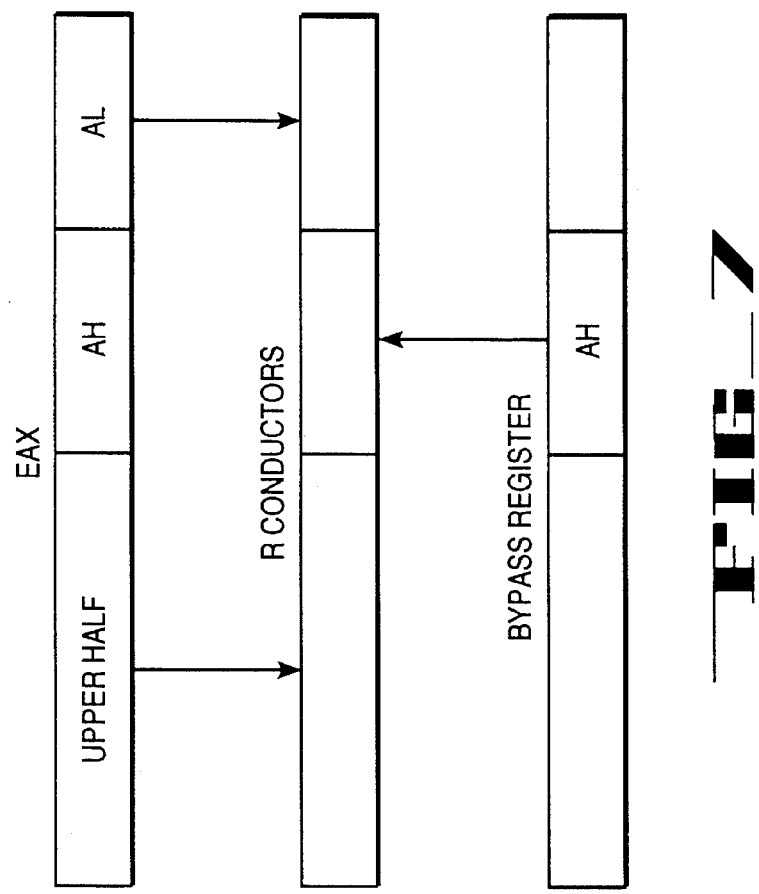
FIG_7
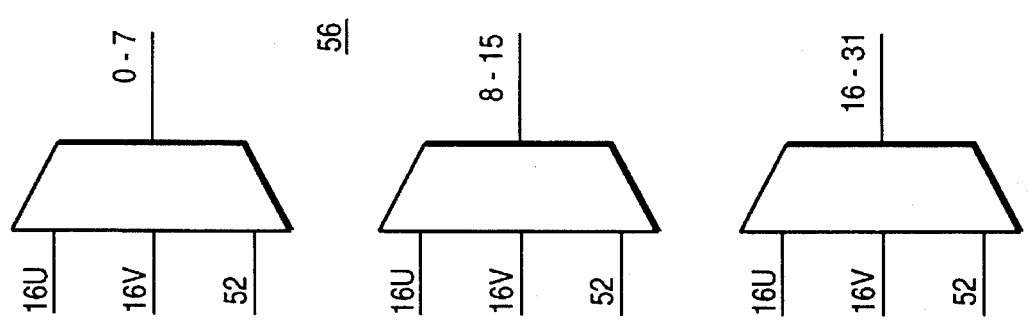
FIG_5

APPARATUS FOR REGISTER BYPASSING IN A MICROPROCESSOR

This is a continuation of application Ser. No. 07/927,708, filed Aug. 10, 1992 now abandoned

BACKGROUND OF THE INVENTION

1. Field of the Invention

This invention relates to microprocessors and, more particularly, to methods and apparatus for increasing the speed of microprocessors.

2. History of the Prior Art

Computer designers are continually attempting to make computers run faster. One way in which this may be accomplished is to make the computer process instructions faster. Typically, a computer processor handles the instructions of any process in sequential order, one after another. Thus, instruction one must be processed or at least begun before instruction two can start.

One way in which the speed of processing is increased is by pipelining instructions. Instead of running each instruction until it is completed and then commencing the next instruction, an instruction is divided into stages which are carried out by different portions of the processor. Then, the stages of sequential instructions are overlapped so that, in general, no portion of the processor lies idle while any particular stage of an instruction is being carried out. Optimally, the processors are designed to pipeline instructions so that each stage of each instruction may be handled in one clock period. The typical stages of a pipelined instruction include a stage in which an instruction is fetched from wherever it is stored, one in which it is decoded, a stage in which the instruction is executed, and a final stage in which the results of the execution stage are written back to storage for later use. The different portions of the processor carry out each of the stages in the pipeline on sequential instructions during each clock period. Thus, during a first clock period the prefetch portion of the processor fetches a first instruction from storage and aligns it so that is ready for decoding. During a second clock period the prefetch portion of the processor fetches the next instruction from storage and aligns it so that is ready for decoding. During the same second clock period, a decoder portion of the processor decodes the first instruction fetched. During a third clock period, the first instruction is executed, the second instruction is decoded, and a third instruction is fetched. By pipelining instructions, the overall speed of operation is significantly increased so that modern microprocessors typically execute one instruction every clock period.

The most prevalent design of personal computers at the present time is based on the 8086 8088, 80286 i386™, and i486™ microprocessors manufactured by Intel Corporation (hereinafter referred to as the Intel microprocessors). The Intel microprocessors utilize five stages of pipelining rather than the four stages outlined above. The stages include a prefetch stage, a first decode stage in which instructions are decoded, a second decode stage in which address of operands of the various instructions is calculated, an execution stage, and a write back stage.

Another way to increase the speed of microprocessors is to allow them to process more than one instruction at the same time. A superscaler processor is a processor which is capable of processing instruction through two separate processing channels at the same time. A new superscaler microprocessor which is able to operate with programs designed for the Intel microprocessors is disclosed in U.S. patent application Ser. No. 07/823,881, entitled *Microprocessor With Apparatus For Parallel Execution of Instructions*, E. Grochowski et al, filed Jan. 23, 1992, and assigned to the assignee of the present invention. The processor disclosed includes a pair of separate arithmetic and logic units (ALUs) which handle data in two separate channels simultaneously. The two channels of the processor derive data and instructions from the same data cache and utilize the same register files and stack.

Because both of the processing channels utilize the pipelining techniques of the previous Intel microprocessors, there are a number of occasions in which instructions in one or the other of the two channels make use of information being processed in an immediately preceding instruction. In such cases, the steps of the pipelining process require that the first of two sequential instructions be completed and its results stored before that information may be used by the next instruction. In such microprocessors, this would often required that the pipeline be stalled for one clock period until the completion of the write back stage of the first instruction.

There are similar occasions in which a stack pointer value is modified by a first instruction and the modified value is used by an instruction immediately following the instruction which modifies the pointer value. Such an operation would typically require that the pipeline be stalled until the stack pointer value from first instruction has been written back to the stack pointer register.

It would be useful to provide circuitry for obviating the need to stall the pipeline to provide for such situations.

SUMMARY OF THE INVENTION

It is, therefore, an object of the present invention to increase the speed of operation of microprocessors.

It is another object of the present invention to provide apparatus for reducing the need to stall the pipeline of Intel microprocessors.

It is another, more specific, object of the present invention to provide apparatus for more rapidly obtaining data from portions of the processing channels so that the need to stall the pipeline is obviated in an Intel microprocessor.

These and other objects of the present invention are realized in a microprocessor having an architecture for pipelining instructions to reduce the time necessary to execute sequential instructions comprising an arithmetic and logic unit for processing information, a register file for storing data to be used by the arithmetic and logic unit, the register file including individual registers from which data is read for operations by the arithmetic and logic unit and to which data which results from operations of the arithmetic and logic unit is written; and means for obtaining updated data from a source other than the register file when sequential instructions processed by the arithmetic and logic unit change data in a particular register in the register file during a first instruction and then use the data in the register file which was changed in a second instruction so that the data in the particular register is stale at the time it is required for the second instruction.

These and other objects and features of the invention will be better understood by reference to the detailed description which follows taken together with the drawings in which like elements are referred to by like designations throughout the several views.

BRIEF DESCRIPTION OF THE DRAWINGS

FIG. 1 is a timing diagram for the operation of the pipeline in an Intel microprocessor.

FIG. 2 is a block diagram of a portion of a microprocessor circuit illustrating a portion of the invention.

FIG. 3 is a timing diagram for the operation of the pipeline in an Intel microprocessor having circuitry superimposed thereon in accordance with the invention to illustrate the sequence of operations in accordance with the invention.

FIG. 4 is a diagram illustrating the flow of data through various stages of circuitry in a microprocessor.

FIG. 5 is a more detailed block diagram of a portion of a microprocessor circuit illustrating circuitry utilizing the various aspects of the invention.

FIG. 6 is a circuit diagram illustrating a detail of the circuit of FIG. 5.

FIG. 7 is a diagram illustrating the flow of data in a portion of the circuit of FIG. 5.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

FIG. 1 is a timing diagram illustrating the stages of the pipeline of an Intel microprocessor. This diagram is useful in discussing the sequence of operations in Intel microprocessors utilizing the present invention. As outlined above, those stages are a prefetch stage P, a first decode stage D1, a second decode stage D2, an execution stage E, and a writeback stage WB. As may be seen in the figure, each stage of the pipeline requires one clock period of a two-phase clock signal CLK. During the second half of the second decode stage D2, the general registers of the microprocessor are read to derive the operand information necessary for the instruction the decoding of which was begun in the first decode stage D1. Then, at the beginning of the write back stage WB, the data provided by the arithmetic and logic unit in response to the execution of an instruction is written back to the general registers.

Two sequential instructions I1 and I2 are illustrated at the bottom of FIG. 1. The first instruction involves a move of data from the ECX register to the EAX register of the microprocessor. The second instruction requires that the data in the EAX register and the EDX register be combined by a Boolean AND operation. The EAX, EBX, ECX, and EDX registers are general purpose registers of the Intel i386 and i486 microprocessors and of the microprocessor used with the present invention each of which stores thirty-two bits. Each of these registers has a lower sixteen bits 0:15 which is referred to and may be separately addressed as the AX, BX, CX, or DX register. These lower sixteen bits are further subdivided into separately addressable eight bit portions AL (0:7) and AH (8:15), BL and BH, CL and CH, and DL and DH.

If two sequential instructions such as those illustrated as instructions I1 and I2 in FIG. 1 are processed, it will be seen that the second instruction I2 uses the data in register EAX provided by the move operation performed during the first instruction I1. As may be seen in FIG. 1, the first instruction I1 is in the execution stage when the second instruction I2 is in the second decode stage D2 at which the general register EAX is read. In these Intel microprocessors, the data provided by the first instruction I1 is not written back to the general register EAX until the writeback stage of the instruction I1 after the data has been read from the register EAX for the next instruction I2 in the pipeline. Consequently, in these microprocessors, the data available in the general register EAX for instruction I2 is stale data; and without the present invention it is necessary to stall the pipeline after the first instruction so that the processor may write back the data necessary to the second instruction before the registers are read for the second instruction. This requires a one clock period delay in the pipeline. The present invention provides, among other things, apparatus for eliminating that delay.

FIG. 2 is a block diagram of a microprocessor circuit 10 designed in accordance with the present invention for eliminating the need to stall the pipeline of an Intel microprocessor to handle sequential register-to-register instructions such as those illustrated in FIG. 1. In FIG. 2 are illustrated an arithmetic and logic unit (ALU) 12, a register file 13, and a data cache 14. The ALU 12 accomplishes its various mathematical and logical operations under control of microcode stored in read only memory (ROM) of the microprocessor of which the ALU 12 and its associated circuitry are a part. Typically, the microcode ROM is a portion of the decode circuitry (not shown) which precedes the ALU 12 in the pipeline; and the various microvectors (microinstructions) are transferred to control the ALU 12 as a part of the particular instruction being implemented. The instructions which provide these microvectors include among other things, encodings designating the registers which are used in each instruction. In general, the register encodings are contained in either the opcode byte or the ModR/M byte of any particular instruction. Details of the instructions including the various register encodings are provided in i486™*Microprocessor Programmer's Reference Manual*, published 1990 by Osbourne McGraw-Hill, pp. 26-1 et seq. The ALU 12 accomplishes arithmetic operations such as add and subtract and logical operations such as AND and OR in a manner well known to those skilled in the art.

The various microvectors cause the ALU 12 to accomplish its different operations utilizing data available in the general register file 13. For example, the ALU 12 executes the two instructions illustrated in FIG. 1 using values stored in the ECX, EAX, and EDX registers of the register file 13. Without the present invention, in order to execute the first instruction, the ALU receives the data which is read from the ECX register of the register file 13 during the second half of the second decode stage on either a set of R or E input conductors. The ALU 12 simply transfers that data to its output during the execution stage of instruction I1 so that the data exists as output on a set of M conductors at the second half of the execution stage of the instruction I1. The data on the M conductors is written back to the EAX register of the register file 13 at the beginning of the writeback stage of the I1 instruction. Thus, without the present invention, it is necessary to stall the pipeline before the data for the second instruction I2 is read from the EAX register so that the stale value held therein can be replaced by the new value resulting from the execution of the instruction I1.

In order to eliminate this delay, the present invention utilizes a bypassing arrangement. The bypassing arrangement includes a bypass latch 16. Data provided at the output to the ALU 12 during the second half of the execution stage is transferred onto the M conductors and to the bypass latch 16 so that it is available as soon as an instruction has executed, typically at the end of the execution stage. A pair of multiplexors 18 and 19 are provided which may select data to be placed on the R or E conductors either from the bypass latch 16 or from the register file 13. A control circuit 31 compares the instruction encoding for the register being modified in the first instruction and the instruction encoding for the register from which data is to be taken of the second instruction. This comparison is done during the second half of the second decode stage of the second instruction (occurring simultaneously with the second half of the execution stage of the first instruction). If the comparison shows that the two compared registers in the two instructions are the same (or that one register is a part of the other larger register), then the control circuit 31 causes the multiplexor 18 or 19 to select the data available in the bypass latch 16 as the data to be used for the second instruction rather than the data read from the general registers of the register file 13. This data selection occurs at the beginning of the execution stage of the second instruction I2 after data becomes available in the bypass latch 16 (at the end of the execution stage of the first instruction). Since the data is available at the bypass latch 16 one clock period earlier than at the output of the register file 13, no delay of the pipeline is necessary. Consequently, the pipeline need not be stalled between two sequential instructions having the same register for both destination and source of data.

A second manner in which the speed of the Intel microprocessors may be accelerated by the present invention occurs with respect to operations involving the stack pointer register ESP. In these microprocessors, the stack pointer value in the stack pointer register ESP is updated after each operation whether the stack pointer changes or not. In order to assist in accomplishing this operation and for updating the data cache 14, the general registers are duplicated in an S unit 23, a unit which accomplishes the address generation for the cache 14. The S unit 23 duplicates the set of general register files except that it does not duplicate the segment selectors. The S unit 23 includes internal circuitry 24 which updates the stack pointer as it is changed by any operation in which the stack pointer register is not explicitly mentioned in the instruction. This updating is accomplished within the S unit 23 by an adder circuit which adds or subtracts the word length (of the value placed on or removed from the stack) from the stack pointer value to provide a new stack pointer value on each clock period. Thus, the stack pointer register ESP is being continuously updated by the S unit 23 for all implicit operations. For example, the S unit 23 causes the ESP register to change values on a POP operation or a PUSH operation and maintains the value in the ESP register during other operations in which the pointer value does not change. For operations in which the stack is not involved implicitly or explicitly, the value of the stack pointer remains the same. The value of the stack pointer as it is updated appears at the output of the S unit 23 on an ASP bus. This value is used to update the ESP register in the general register file.

When the stack is involved in two sequential instructions in which the value in the ESP register is implicitly varied in a first instruction and the ESP register is a source of a value in a second instruction, then the updated stack pointer value provided by the first operation is provided on the ASP bus to update the ESP register. This updating of the general registers in the general register file occurs at the beginning of the writeback stage. However, the stack pointer value must be available at the time that value is needed in the second instruction (when data is read from the general registers). Consequently, since the new stack pointer value is obtained on the ASP bus, either the pipeline must be stalled or there must be a way to obtain a value by bypassing the ESP register in the general register file.

Moreover, the stack pointer may be varied either by the circuitry in the S unit, by the circuitry of the ALU 12, or from memory. If the instruction explicitly mentions the stack pointer register ESP, the updating is accomplished by the ALU 12 or from memory; if not, the updating is accomplished by the S unit 23 using the ASP bus. Thus, any bypassing circuitry must also provide for bypassing the ESP register in the general register file when that register contains a stale stack pointer value.

FIG. 3 illustrates a pair of sequential instructions I1 and I2 in which the stack pointer value changes implicitly in the first instruction and is used in the second instruction. In the first operation designated by the instruction I1, the value held in the stack at the position pointed to by the stack pointer is removed from the stack and placed in the EAX register. This causes the value of the stack pointer to change by the length of the value removed from the stack. Thus, the stack pointer is updated in the ESP register(s) by the S unit circuitry and is available on the ASP bus. In the second instruction I2, the value in the ESP register is moved to the EDX register. This requires that the stack pointer value which is being updated during the execution of the instruction I1 be available for use by the ALU 12 in the execution of the instruction I2. Without the present invention, the correct value of the stack pointer is not available from the register file 13 until the write back stage of instruction I1; and the pipeline must be stalled for one clock.

As mentioned above, in all instructions which are not explicit stack register instructions, the stack pointer is updated on the ASP bus. In explicit stack instruction which move through the ALU 12, the stack pointer is updated from the M conductors and the bypass latch 16 in the same manner as are the other registers when the values therein are being changed by the ALU 12. This occurs because the value in the ESP register is provided by the ALU 12 when the operation is an explicit operation in which the ESP register is the destination for the data which is being handled by the ALU 12. For these operations, the new stack pointer value must come from the ALU 12 via the bypass latch 16 in order to be available without stalling the pipeline.

FIG. 3 includes a timing diagram with superimposed circuitry by which the selection of the appropriate stack pointer values may be implemented in accordance with the present invention. The superimposition places a component of the circuitry at the point in time of the pipeline at which it takes effect. A new multiplexor 30 receives input signals from the register file 13 and the ASP bus during the second half of the D2 stage of instruction I2. A control signal is furnished from control circuitry 31 to cause the selection of the appropriate signal by the multiplexor 30. If the operation is an implicit operation involving the stack pointer, the value of the stack pointer is taken from the ASP bus. As may be seen, the value of the ESP register is updated by a value placed on the ASP bus by the S unit 23 during the first half of the execution stage of the pipeline when the POP instruction I1 is being executed. Since this value comes from the instruction I1, this value is then available during the second half of the D2 stage of instruction I2 at the multiplexor 30. Consequently, the multiplexor 30 may select from either the register file or the ASP bus for the value of the stack pointer. Since the general register file is not updated until the beginning of the write back stage of instruction I1, the value in the ESP register is stale. Consequently, an updated value must be selected or the pipeline stalled until the register is updated with a valid stack pointer value.

The control circuitry of the multiplexor 30 should select the value on the ASP bus if the ESP register is the destination for the new stack pointer created during the first instruction in the sequence, if the first operation is not an explicit operation involving the ESP register, and if the ESP register is to be explicitly varied during the second instruction so that its value is needed by the ALU 12. A POP instruction such as instruction I1 satisfies these desiderata so the value on the ASP bus is used. In fact, in one embodiment of the invention, the first instruction I1 need not vary the value of the stack pointer for the ASP bus to be selected for an explicit instruction to follow. Since the stack pointer is always recirculated on the ASP bus even though it is not changed, either the register value or the ASP bus value is correct when the stack pointer does not change. The comparison circuitry is simplified by always using the value on the ASP bus whenever the next instruction uses the ESP register as an explicit source for a value.

This value on the ASP bus transferred by the multiplexor 30 is latched in a latch 32 at the beginning of the execution stage of the second instruction and furnished to a second multiplexor 18 (or 19). The multiplexor 18 also receives the value furnished on the M conductors of FIG. 1 from the latch 16; this value is available in the second half of the execution stage of the first instruction I1 as outlined above. Since the first instruction is not an explicit ESP register operation, the value furnished by the ALU 12 as a result of the first instruction is not the stack pointer value but is the value to be stored in the EAX register. Consequently, the multiplexor 18 selects the value stored in the latch 32 produced on the ASP bus and transfers that value on the R conductors (or the E conductors) to the ALU 12 for use in the ALU manipulation of the stack pointer value in the second instruction of the sequence.

On the other hand, if the ALU 12 is explicitly manipulating the value of the stack pointer during the first instruction of a sequence of two instructions in which the stack pointer is used in the second instruction, then the value produced at the output of the ALU 12 on the M conductors and latched in the latch 16 is the correct value while the value on the ASP bus does not take the manipulation of the value by the ALU 12 into consideration. For example, were the first instruction to be MOV ESP,EDX and the second instruction MOV EAX,ESP, then the multiplexor 18 would be controlled to transfer the value from the bypass latch 16 onto the R conductors for use by the next explicit ALU manipulation.

The various arrangements for bypassing discussed above are subject to substantial enhancements which allow the circuitry to function even more efficiently. The ALU 12 with which the present invention is used deals with operations involving eight bit quantities which are aligned on a thirty-two bit boundary. Consequently, whenever data is furnished to the ALU in an eight bit word length, the data must be aligned word so that the lowest order bit is in the zero bit position. In the present invention, when the eight bit word is in the AL, BL, CL, and DL registers, all thirty-two bits in the registers are furnished at the output of the register. A multiplexor (or multiplexors) selects the lower eight bits and fills the remaining bit positions with zeroes. When the eight bit word is in the AH, BH, CH, and DH registers, all of the thirty-two bits in the registers are again furnished at the output of the register. However, the multiplexor selects the eight bits in the 8:15 positions, transfers those bits to the 0:7 bit positions, and fills the remaining bit positions with zeroes. This occurs in the Intel microprocessor utilizing the circuitry of the present invention whenever an eight bit operation involving the AH, BH, CH, and DH registers occurs. The use of the multiplexor in this manner causes the eight bits to be in the correct position on the R or E conductors before being furnished to the ALU 12 for manipulation. This occurs, for example, in an instruction such as MOV BL,AH in which the data in the high eight bits of the AX register (the lower sixteen bits of the EAX register) are moved to the lower eight bits of the BX register (the lower eight bits of the EBX register). This operation is illustrated in FIG. 4. As may be seen, the value stored in the AH register portion of the EAX register in the general register file is placed on the R conductors in the 0:7 bit positions and the bit positions 8:31 are filled with zeroes. The ALU 12 takes the value on the R conductors in this move operation and places it on the M conductors.

In the present invention, however, the ALU 12 also examines the word length of the value being handled and, if the word length is eight bits, controls an output multiplexor to duplicate the eight bits in each of the 0:7 and 8:15 bit positions at its output. This allows the choice at that point of selecting either the upper or lower eight bits in order to accomplish a register update. The appropriate bits selected may then be placed on the M conductors to be written in the writeback stage into the register file and stored in the bypass latch 16 so that they may be used in the bypass operation discussed above. As will be explained, it is then possible to do a selective update of a register or a selective update of data furnished to the ALU 12 using only the bits involved in the operation during a bypass operation.

FIG. 5 illustrates circuitry in accordance with the present invention by which a selective update of the register files, the ALU operation, and the two bypass operations discussed above may be accomplished. The circuit 50 illustrated in FIG. 5 includes an ALU 12, a register file 13, and a data cache 14 just as in the circuit 10 of FIG. 2. The superscaler processor which utilizes the present invention includes a pair of processing channels and, consequently, utilizes a second ALU which is not shown in the figure. In addition, the control circuitry and multiplexors discussed in reference to FIG. 5 are all duplicated in the second channel but are not shown in the figure. Only one register file 13 and one data cache 14 are used in the two channel arrangement. It is felt that the explanation sufficiently covers the two channels that only a single channel need be shown. Where two channels are involved in a particular operation, the discussion covers that aspect and circuit connections are shown. The details of the two channel arrangement are described in the above-mentioned patent application entitled, *Microprocessor With Apparatus For Parallel Execution of Instructions.*

As with the circuit 10 of FIG. 2, in a register-to-register instruction in the U channel (the channel shown in the figure), data is read from the appropriate register of the register file 13 and placed on one of the two source conductors R or E which furnish input to the ALU 12 (data is similarly read from the register file 13 for the other channel). Thirty-two bits of data are presented at the output of any register in the register file which is read. This data is furnished at the input to a multiplexor 51e or 51r. Also furnished at the input to the multiplexors 51 are input values from the ASP bus. This allows ASP bus values to be selected when it is desired to bypass the register file 13 during a stack operation in which the data is being changed in the stack pointer register ESP by an instruction in which the stack pointer is not changed explicitly. In addition, a third input allows the selective zero fill of the upper bits of the particular conductors (R or E) when an eight or sixteen bit value is to be read. When, for example, the AL register is read, bits 8:31 may be filled by zeroes; and when the AX or the AH register is read, bits 16:31 may be filled by zeroes. The value selected either from the register file 13 or the ASP bus is placed in a latch 52e or 52r.

The value which is selected by one of the multiplexors 51 depends on the criteria explained above in the discussion of FIG. 3 (regarding the multiplexor 30). Typically, the value selected comes from the register file unless a first of two sequential instructions varies the stack pointer and the second instruction uses the stack pointer as a source of data. That is, when the stack pointer data in the ESP register is varied, but not explicitly, on a first instruction and is used explicitly in a succeeding instruction by the ALU 12, the stack pointer value is selected from the ASP bus. This control value for the multiplexor 51 is provided by a control circuit 54 which receives input values from decoding circuitry (not shown) indicating the destination register for the data in the first instruction the data of which is being varied (including the ESP register for an implicit stack operation), and the source register which holds the data to be used in the second instruction. The destination register for the data in the first instruction is provided by the decoder of the channel doing the manipulation of the data for the first instruction so the register encodings of the source are shown as coming from either the U or the V channel. The register encodings used in the second instruction may be provided by either channel but each channel derives the source data from the general register file 13 on either the source conductors S1 or S2. The two register encodings are compared including whether the first instruction involves an implicit stack operation; if the ESP register is involved in both instructions, then the data on the ASP bus is selected. The word length of the data involved (decoded from the instruction) and the register of the source determine which bits are zero filled.

The data in the latch 52e or 52r is furnished at the input of a multiplexor 56r or 56e. The multiplexor 56 also receives as input the value stored in the bypass latch 16U and the value stored in a similar bypass latch 16V which stores the value produced by the ALU of the V channel. These are the values which reside in a destination register in a first instruction. Thus, the multiplexor 56 may select among a general register value or the ASP bus value (whichever is provided by the latch 52), the bypass value from the U channel, and the bypass value from the V channel. Thus, the multiplexor 56 is controlled to select the proper value depending on the criteria set forth with respect to the circuit 10 of FIG. 2. The control logic 54 receives the register encodings designating the registers used in sequential instructions; if they are the same (or one is a portion of the other as the AL, AH, and AX registers are portions of the EAX register), a bypass operation may be required. The control circuit 54 may provide a signal to select either the bypass value from the U channel bypass latch 16U or the V channel bypass latch 16V depending on the channel handling the first and the second instructions. For example, if the first of two sequential instructions is handled in the U channel and the second in the V channel, and the same register receives data in the first instruction and is a source of data for the second instruction, then the value in the bypass latch 16U is used for the multiplexor of the V channel which performs the function of multiplexor 56 in the U channel. Alternatively, if the first of two sequential instructions is handled in the V channel and the second in the U channel, then the value in the bypass latch 16V is used for the multiplexor 56 in the U channel. If both instruction are handled in the same channel, then the value in the bypass latch of that channel is used.

To make the circuitry more efficient, the selective bypassing operation referred to above may also be provided by the multiplexor 56. This is accomplished by dividing the multiplexor 56 into three separate multiplexors such as is shown in FIG. 6. A first of these multiplexors transfers data onto bits 0:7 from bits 0:7 of the value stored in the latch 52, of the value stored in the bypass latch 16U, or of the value stored in the bypass latch 16V. In a similar manner, a second multiplexor transfers data onto bits 8:15 from bits 8:15 of the value stored in the latch 52, of the value stored in the by pass latch 16U, or of the value stored in the bypass latch 16V. Likewise, a third multiplexor transfers data onto bits 16:31 from bits 16:31 of the value stored in the latch 52, of the value stored in the bypass latch 16U, or of the value stored in the bypass latch 16V. The control circuit 54 provides signals in the manner to be explained so that, as shown in FIG. 7, a portion of the data may come from the register file while only the portion being changed comes from one of the bypass latches 16U or 16V.

FIG. 7 illustrates a pair of instructions in which data is first being moved into the eight bit register AH and then the data in the entire thirty-two bit register EAX is used in a Boolean AND operation. The registers used in both instructions are the same as determined from register encodings of the two instructions by a comparator in circuit 54 so that a bypass using the bypass register 16(U or V) is necessary. However, only the value in the AH portion of the EAX register is changing so only this data needs to be bypassed. This is accomplished by taking the lower eight bits 0:7 and the upper sixteen bits 16:31 from the register file EAX and combining those using the multiplexor 56 with the bits 8:15 of the bypass value held in the bypass latch 16. Since three separate multiplexors are included in each multiplexor 56, the control circuit 54 need only select the appropriate signals through those three multiplexors. This is accomplished by assigning a byte enable value of 001 to any register encoding for an eight bit low register (AL, BL, CL, or DL), a value of 010 to any register encoding for an eight bit high register (AH, BH, CH, or DH), a value of 011 to any register encoding for a sixteen bit register (AX, BX, CX, or DX), and a value of 111 to any register encoding for an thirty-two bit register (EAX, EBX, ECX, or EDX). The encodings of the two registers for which the comparisons are made to determine if a bypass is necessary are given these values. In one embodiment, a multiplexor in the circuit 54 controlled by the register encodings and word length is used to generate these values. If the registers are the same or part of the same register, then the two encodings are treated to a Boolean AND operation by the circuit 54. The result of this operation decides the portion of the data to be obtained from the bypass register 16.

For example, if the AL and AL registers are the two registers involved, an AND of 001 and 001 provides 001 as a result. This value 001 indicates that the lower eight bits are to be taken from the bypass latch 16. On the other hand, if the AH registers and the EAX registers are the two registers involved, an AND of 010 and 111 provides 010 as a result. This value 010 indicates that the upper eight bits (8:15) are to be taken from the bypass latch 16 while the remainder of the bits are taken from the register EAX since those bits do not change. In a similar manner, when the AL and AX registers are involved, an AND of 001 and 011 provides 001 as a result. This value 001 again indicates that the bypass value is to be taken from the lower eight bits of the latch 16. On the other hand, when the AL and AH registers are involved, even though the same primary register is involved in each instruction, the AND operation of 001 and 010 produces a value of 000 demonstrating that bypassing is in fact not necessary since the value in the portion of the register to be used in the second instruction (whichever one of the two it may be) is not being varied by the first instruction. Thus, the circuitry which provides the selective bypassing ability allows the avoidance of bypassing where it is unnecessary.

The value provided by the multiplexor 56 is transferred as input to a multiplexor 58e or 58r. Each multiplexor 58 is also a set of three multiplexors which transfer the value furnished as individual bits 0:7, 8:15, and 16:31 to the ALU 12. The first of the multiplexors receives inputs from both the 0:7 and the 8:15 bits of the value furnished by the multiplexor 56 and transfers one or the other to the 0:7 input conductors of the ALU 12. This portion of the multiplexor 58 provides the facility for placing the bits originally in the AH, BH, CH, and DH registers in the 0:7 positions at the input to the ALU 12. The second multiplexor of the multiplexor 58 receives both the 8:15 bits from the multiplexor 56 and zeroes; the second multiplexor transfers one or the other to the 8:15 input conductors of the ALU 12. This allows direct transfer of the 8:15 bits or the filling of those bits with zeroes. Similarly, the third multiplexor of the multiplexor 58 receives both the 16:31 bits from the multiplexor 56 and zeroes and transfers one or the other to the 16:31 input conductors of the ALU 12. Thus, the multiplexor 58 is controlled by the control circuit 54 to transfer the value of the 8:15 bits to the low order bits if the instruction being handled is an eight bit instruction from one of the high eight bit registers.

Finally, a multiplexor 60 at the output of the ALU 12 duplicates any eight bit value provided by the ALU on both the 0:7 and 8:15 bit output lines on the M conductors and the latch 16. In this manner, the value may be easily written to the particular low or high eight bit register selected by the selective bypass operation described above.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A microprocessor having an architecture for pipelining instructions to reduce the time necessary to execute sequential instructions comprising:
   a) a first arithmetic logic unit (ALU) and a second ALU, each ALU having a first data input, a second data input and a data output;
   b) a register file including individual registers from which data is read for operations by the ALUs and to which data is written which results from operations of the ALUs, the register file having at least one write port which receives data from the ALUs and at least one read port which provides data to the ALUs;
   c) a first latch having an input coupled to receive data from the output of the first ALU;
   d) a second latch having an input coupled to receive data from the output of the second ALU; and
   e) a mechanism configured to provide updated data to at least one of the ALUs, the updated data originating from one of the latches, wherein each ALU may begin processing an instruction using the updated data from one of the latches before a result of an immediately previous instruction is written to a particular register.

2. A microprocessor as claimed in claim 1 in which the mechanism providing updated data to at least one of the ALUs further includes
   a selection circuit for choosing data stored in one of the latches when the particular register stores stale data.

3. A microprocessor as claimed in claim 1 in which the mechanism providing updated data to at least one of the ALUs further includes:
   a stack pointer bus, and
   a selection circuit for choosing data provided from the stack pointer bus when the particular register contains stale data.

4. A microprocessor as claimed in claim 1 further including means for transferring eight bit portions of data furnished by the register file to an ALU aligned at a lowest order bit boundary without stalling the operation of the ALU.

5. A microprocessor as claimed in claim 1 further including means for duplicating bits of each eight bit word furnished at the output of an ALU in both a low order bit position and in a next highest eight bit position.

6. A microprocessor as claimed in claim 1 in which the means for providing updated data to at least one of the ALUs includes means for selectively replacing only portions of the data in the register file which are stale.

7. In a microprocessor, a method comprising the steps of:
   a) decoding a first instruction that specifies a stack pointer register as a destination for a result of the first instruction, the first instruction specifying an operand:
   b) decoding a second instruction specifying the stack pointer register as an operand;
   c) executing the first instruction by a first arithmetic and logic unit (ALU) to produce the result of the first instruction;
   d) generating an updated stack pointer in a second ALU, where the second ALU performs an operation selected from the group consisting of addition or subtraction upon the stack pointer and the length of the operand specified by the first instruction;
   e) supplying the updated stack pointer from the second ALU by a stack pointer bus; and
   f) selecting the stack pointer bus to provide the stack pointer in place of the stack pointer register such that the first ALU begins executing the second instruction before the result of the first instruction is written to the first register and that operation of the ALU is not stalled.

8. The method of claim 7 further comprising the step of: writing the stack pointer register during a same clock cycle that the first ALU begins executing the second instruction.

9. A pipelined microprocessor comprising:
a) A first and a second arithmetic-logic-unit, each ALU having at least a first input, a second input, and an output;
b) a multiport register file having at least one write port and at least two read ports capable of simultaneous operation, wherein the register file contains a stack pointer and a plurality of data registers;
c) a first latch having an input and an output, where the input of the first latch is coupled to receive data from the output of the first ALU;
d) a second latch having an input and an output, where the input of the second latch is coupled to receive data from the output of the second ALU; and
e) data selection means having at least three inputs and an output, wherein the data output by the data selection means is coupled to the first input of the first ALU, the first input of the data selection means is coupled to receive data from the output of the first latch, the second input of the data selection means is coupled to receive data from the output of the second latch, and the third input of the data selection means is coupled to receive data from a read port of the register file.

10. The microprocessor of claim 9 further comprising: a second data selection means having at least three inputs and an output, wherein the output of the second data selection means is coupled to receive the second input of the first ALU, the first input of the data selection means is coupled to receive the output of the first latch, the second input of the data selection means is coupled to receive the output of the second latch, and the third input of the data selection means is coupled to receive data from a read port of the register file.

11. The microprocessor of claim 9 further comprising:
a first control circuit coupled to the data selection means such that when a first operation destination location in the register file is the same location in the register file as a source location required for a subsequent operation the data selection means may be able to pass data from the output of the first latch to the first ALU; and
a second control circuit coupled to the data selection means such that when the condition of the first control circuit is not satisfied and the stack pointer is required for an operation the data selection means may pass data from the output of the second latch to the first ALU.

12. A pipelined microprocessor comprising:
a) an arithmetic and logic unit (ALU) for processing information, where the ALU operates on one or more input data words of width N times M bits, and where the ALU has an output of width N times M bits, where N and M are not less than two;
b) first data selection means having as a first input the lowest order M bits of the ALU output and as a second input the next highest order M bits of the ALU output, the first data selection means having an output of width M;
c) a result bus of width N times M bits which receives on its lowest order M bits data from the lowest order M bits of the ALU, and on its next higher order M bits data from the first data selection means such that the first data selection means operates to selectively duplicate data from the lowest order M bits of the ALU into the next highest M bit positions of the result bus;
d) a register file for storing data to be used by the ALU, the register file including individually selectable registers of width N time M bits which may be read onto at least one read port, the register file having at least one write port of width N times M bits which receives data from the result bus, and where the register file has a plurality of write control lines such that groups of M bits within a register within the register file may be written independently;
e) bypass means which receives data from the result bus and having an output;
f) a second data selection means of width N times M bits having as a first input data from the register file, as a second input data from the bypass means, an output, such that the second data selection means may pass an entire word from the register file to its output, or may substitute data from the bypass means for one or more groups of M bits; and alignment means which receives data from the second data selection means and which may selectively present to an input of the ALU either the entire data or data from the second lowest order group of M bits transposed into the lowest order M bit positions.

13. The microprocessor of claim 12 wherein M is a member of the group consisting of 8 and 16, and N is a member of the group consisting of 2, 4, and 8.

14. A pipelined microprocessor comprising:
a) a first and a second arithmetic and logic units (ALUs) for processing information, where these ALUs operates on one or more input data words of width N times M bits, and where these ALUs have an output of width N times M bits, where N and M are not less than two;
b) first data selection means having as a first input the lowest order M bits of the first ALU output and as a second input the next highest order M bits of the first ALU output, the first data selection means having an output of width M;
c) a first result bus of width N times M bits which receives on its lowest order M bits data from the lowest order M bits of the first ALU, and on its next higher order M bits data from the first data selection means such that the first data selection means operates to selectively duplicate data from the lowest order M bits of the first ALU into the next highest M bit positions of the first result bus;
d) a second result bus of width N times M bits which receives data from the second ALU;
e) a register file for storing data to be used by the ALU, the register file including individually selectable registers of width N time M bits which may be read onto at least one read port, the register file having at least one write port of width N times M bits which receives data from the result bus, and where the register file has a plurality of write control lines such that groups of M bits within a register within the register file may be written independently;
f) a first bypass means which receives data from the first result bus and having an output,
g) a second bypass means which receives data from the second result bus and having an output,
h) N bypass selection means each of width M bits having each having as a first data M bits of input data from the register file, as a second data input M bits of data from the first bypass means, as a third data input M bits of data from the second bypass means, and an output, where the first of these bypass selection means operates on the least significant M bits of the data from each input and the second of these bypass selection means operates on the group of M bits having next highest significance than the least significant M bits; and i) alignment means which receives data from the first and second bypass selection means and which may selectively present to the least significant M bits of the first ALU data selected from the group including the first and the second bypass selection means.

15. The microprocessor of claim 14 wherein M is a member of the group consisting of 8 and 16, and N is a member of the group consisting of 2, 4, and 8.

16. A pipelined microprocessor comprising:

a) a first, a second, and a third arithmetic and logic units (ALUs) for processing information, where these ALUs operates on one or more input data words of width N times M bits, and where these ALUs have an output of width N times M bits, where N and M are not less than two;

b) first data selection means having as a first input the lowest order M bits of the first ALU output and as a second input the next highest order M bits of the first ALU output, the first data selection means having an output of width M;

c) a first result bus of width N times M bits which receives on its lowest order M bits data from the lowest order M bits of the first ALU, and on its next higher order M bits data from the first data selection means such that the first data selection means operates to selectively duplicate data from the lowest order M bits of the first ALU into the next highest M bit positions of the first result bus;

d) a second data selection means having as a first input the lowest order M bits of the second ALU output and as a second input the next highest order M bits of the second ALU output, the second data selection means having an output of width M;

e) a second result bus of width N times M bits which receives on its lowest order M bits data from the lowest order M bits of the second ALU, and on its next higher order M bits data from the second data selection means such that the second data selection means operates to selectively duplicate data from the lowest order M bits of the second ALU into the next highest M bit positions of the second result bus;

f) a third result bus of width N times M bits which receives data from the third ALU;

g) a register file for storing data to be used by the ALUs, the register file including individually selectable registers of width N time M bits which may be read onto at least one read port, the register file having at least one write port of width N times M bits which receives data from the first result bus, at least one write port of width N times M bits which receives data from the second result bus, at least one write port which receives data from the third result bus, and where a register within the register file where the register file has a plurality of write control lines such that groups of M bits within a register within the register file may be written independently;

h) a first bypass means which receives data from the first result bus and having an output;

i) a second bypass means which receives data from the second result bus and having an output;

j) a third bypass means which receives data from the third result bus and having an output;

k) N bypass selection means each of width M bits having each having as a first data M bits of input data from the register file, as a second data input M bits of data from the first bypass means, as a third data input M bits of data from the second bypass means, and an output, where the first of these bypass selection means operates on the least significant M bits of the data from each input and the second of the bypass selection means operates on the group of M bits having next highest significance than the least significant M bits; and l) alignment selection means which receives data from the first and second bypass selection means and which may selectively presents to the least significant M bits of the first ALU data selected from a group including the data output by the first and the second bypass selection means.

* * * * *

UNITED STATES PATENT AND TRADEMARK OFFICE
CERTIFICATE OF CORRECTION

PATENT NO.   : 5,619,668
DATED        : April 8, 1997
INVENTOR(S) : Syed A. A. Zaidi It is certified that error appears in the above-indentified patent and that said Letters Patent is hereby corrected as shown below:

In column 8 at line 11 delete "word"

Signed and Sealed this

Fifteenth Day of July, 1997

*Attest:*

BRUCE LEHMAN

*Attesting Officer*   Commissioner of Patents and Trademarks